United States Patent
Crain et al.

(10) Patent No.: US 8,253,022 B2
(45) Date of Patent: Aug. 28, 2012

(54) DEVICE AND METHOD FOR MECHANICALLY BONDING AND GROUNDING PAINTED CABLE TRAYS

(75) Inventors: Robert Crain, O'Fallon, IL (US); Dallas Kellerman, Belleville, IL (US)

(73) Assignee: Cablofil, Inc., Mascoutah, IL (US)

( * ) Notice: Subject to any disclaimer, the term of this patent is extended or adjusted under 35 U.S.C. 154(b) by 599 days.

(21) Appl. No.: 12/489,583

(22) Filed: Jun. 23, 2009

(65) Prior Publication Data

US 2010/0320334 A1 Dec. 23, 2010

(51) Int. Cl.
*H02G 15/02* (2006.01)
(52) U.S. Cl. ........ 174/78; 174/95; 174/97; 174/51; 248/49; 29/650; 439/92
(58) Field of Classification Search ........ 174/99 R, 174/95, 97, 51, 78; 211/119; 108/108; 403/329; 248/49, 53; 29/650; 439/92, 100
See application file for complete search history.

(56) References Cited

U.S. PATENT DOCUMENTS

| | | | |
|---|---|---|---|
| 5,401,905 A * | 3/1995 | Lesser et al. | 174/99 R |
| 6,313,405 B1 * | 11/2001 | Rinderer | 174/68.3 |
| 6,869,295 B2 * | 3/2005 | Hein et al. | 439/95 |
| 7,364,455 B2 * | 4/2008 | Diessner et al. | 439/498 |
| 7,910,832 B2 * | 3/2011 | Pieh et al. | 174/99 R |
| 8,081,415 B2 * | 12/2011 | Nolletti | 361/220 |

* cited by examiner

*Primary Examiner* — Dhirubhai R Patel
(74) *Attorney, Agent, or Firm* — Bryan Cave LLP

(57) ABSTRACT

A suspension tray is provided that is adapted to hold a plurality of cables and/or wires that includes a device for electrically bonding and grounding the tray. The tray includes a series of spokes forming a wire mesh support on which the cables and/or wires are placed. The device (which serves to electrically bond and ground the tray) includes a plurality of conductive elements affixed to the wire mesh support. Each conductive element may include two side portions and a middle portion. The two side portions are preferably sealed with a paint composition and the middle portion includes a conductive surface that is capable of electrically bonding and grounding the tray.

12 Claims, 4 Drawing Sheets

DEVICE AND METHOD FOR MECHANICALLY BONDING AND GROUNDING PAINTED CABLE TRAYS

FIELD OF THE INVENTION

The field of the invention relates to methods for bonding and grounding painted cable trays.

BACKGROUND OF THE INVENTION

Telecommunication and power cables are present and used in most, if not all, buildings today—including commercial buildings, residential buildings, and others. Of course, such cables are a necessity to bring power to a building, and enable communication with other parties outside the building. Indeed, they are a basic necessity for any building.

It is commonplace to locate and house telecommunication and/or power cables within a tray (or other device). When telecommunication and/or power cables are placed in these trays, a means for bonding and grounding wires and cables contained therein is required, as required by applicable building codes. That is, a means for providing a system that will operate as a sink for (and absorb) an electrical charge is needed. When painted cable trays are employed, current methods of bonding and grounding such trays will often involve leaving certain portions of the tray unpainted, such that an unpainted steel portion of the tray is exposed that may be mechanically spliced together to create a means for electrically bonding and grounding such trays. This rudimentary method, however, is often unsatisfactory because the steel portions of such trays will often corrode and rust over time, thereby compromising the electrical continuity of the bonding and grounding ability thereof.

Accordingly, a need exists for improved devices and methods for bonding and grounding the types of painted cable trays mentioned above and described below.

SUMMARY OF THE INVENTION

According to a first aspect of the present invention, a suspension tray is provided that is adapted to hold a plurality of cables and/or wires, which includes a device for bonding and grounding the tray. The tray may comprise a series of spokes forming a wire mesh support on which the cables and wires are placed. The device (which serves to electrically bond and ground the tray) comprises a plurality of conductive elements affixed to the wire mesh support. Each conductive element comprises two side portions and a middle portion, and is attached to the suspension tray by wrapping the conductive element around a spoke of the tray, such that the opposite ends of the conductive element can be connected to each other by a conductive adhesive material. The two side portions are preferably sealed with a paint composition, such that moisture is not allowed to penetrate the interior of the conductive element that has been folded together around the above-mentioned spoke, and the middle portion comprises a conductive surface that is capable of bonding and grounding the conductivity between sections of tray.

According to another aspect of the present invention, methods for mechanically bonding and electrically grounding a cable tray are provided. More particularly, the methods generally comprise providing a tray which includes a series of spokes, e.g., interconnecting wires, which form a wire mesh support on which a plurality of cables and wires may be placed. The methods further comprise attaching a plurality of conductive elements to the wire mesh support. Preferably, as described above, each conductive element will be configured to be attached to (wrapped around a spoke of) the wire mesh support. Each conductive element will preferably include two side portions and a middle portion, with the two side portions being exposed to the air and the middle portion being covered by a masking layer. Next, the invention provides that paint may be applied to the tray and conductive elements affixed thereto, such that the tray and conductive elements are covered with the paint composition. The methods of the present invention further comprise removing the masking layer from the middle portion of each conductive element, in order to uncover an unpainted conductive surface. The methods further comprise attaching a conductive splice between the conductive surfaces of each of the plurality of conductive elements.

According to additional aspects of the present invention, kits are provided that may be used to construct the devices and/or carry out the methods described herein.

The above-mentioned and additional features of the present invention are further illustrated in the Detailed Description contained herein.

DETAILED DESCRIPTION OF THE INVENTION

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 1:
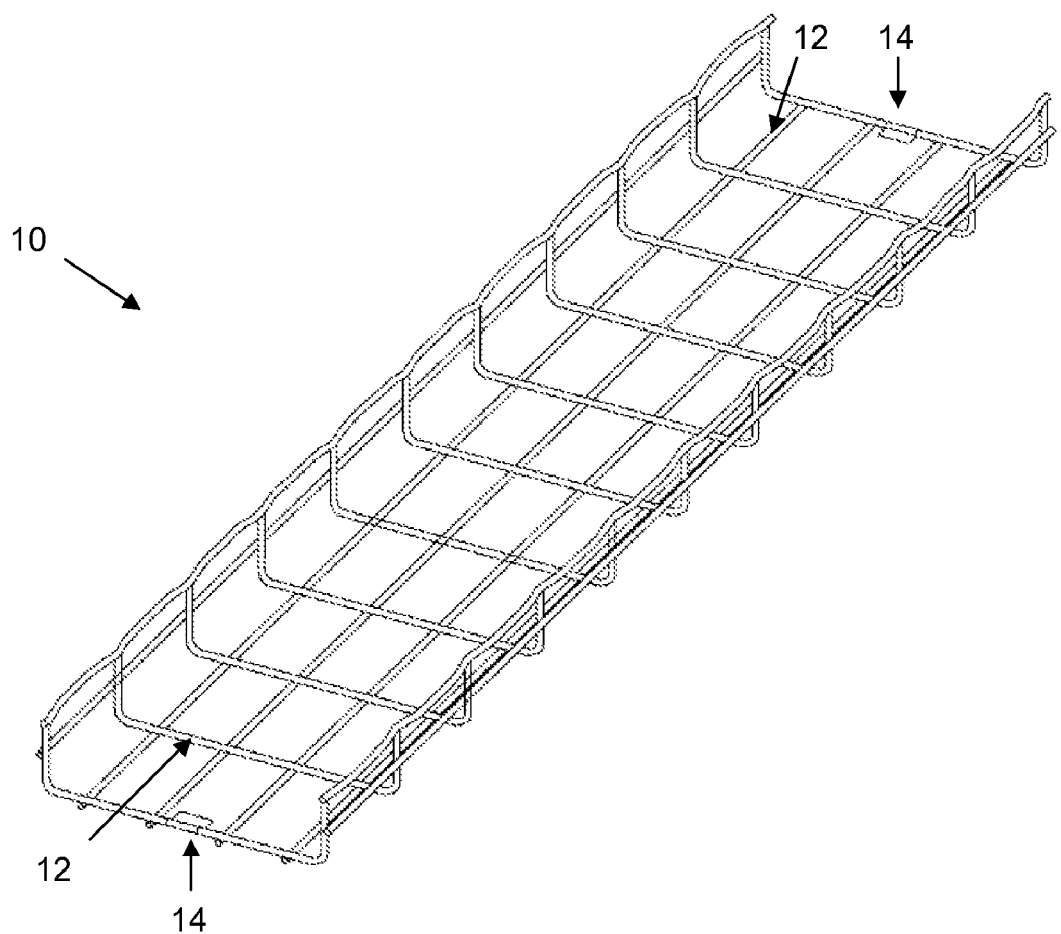
FIG. 1 is a perspective view of the suspension tray and wire mesh support described herein, with a conductive element affixed to each end of the tray.
Figure 2:
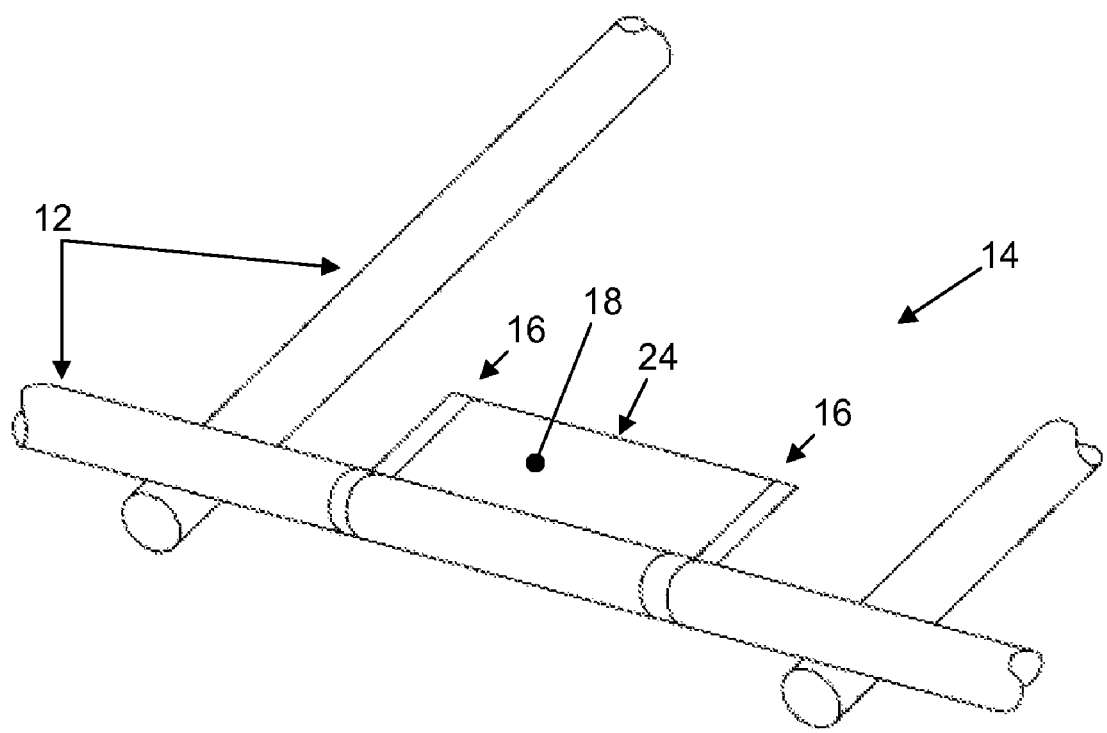
FIG. 2 is a magnified perspective view of a conductive element affixed to a spoke of the wire mesh support described herein.

Referring to FIGS. 1-2, according to certain preferred embodiments of the present invention, a suspension tray 10 is provided that is adapted to hold a plurality of cables and/or wires (not shown), which includes a device for electrically bonding and grounding the tray. More particularly, the tray 10 comprises a series of spokes 12 that together form a wire mesh support on which the cables and wires are placed. The device (which serves to electrically bond and ground the tray) comprises a plurality of conductive elements 14 affixed to the wire mesh support. Each conductive element 14 may comprise two side portions 16 and a middle portion 18, which are preferably comprised of the same conductive material (and positioned within the same plane). The two side portions 16 edges are preferably sealed with a paint composition (as described further below) and the middle portion 18 comprises a conductive surface that is capable of electrically bonding and grounding the tray, when the conductive elements 14 are mechanically spliced together.

Figure 3:
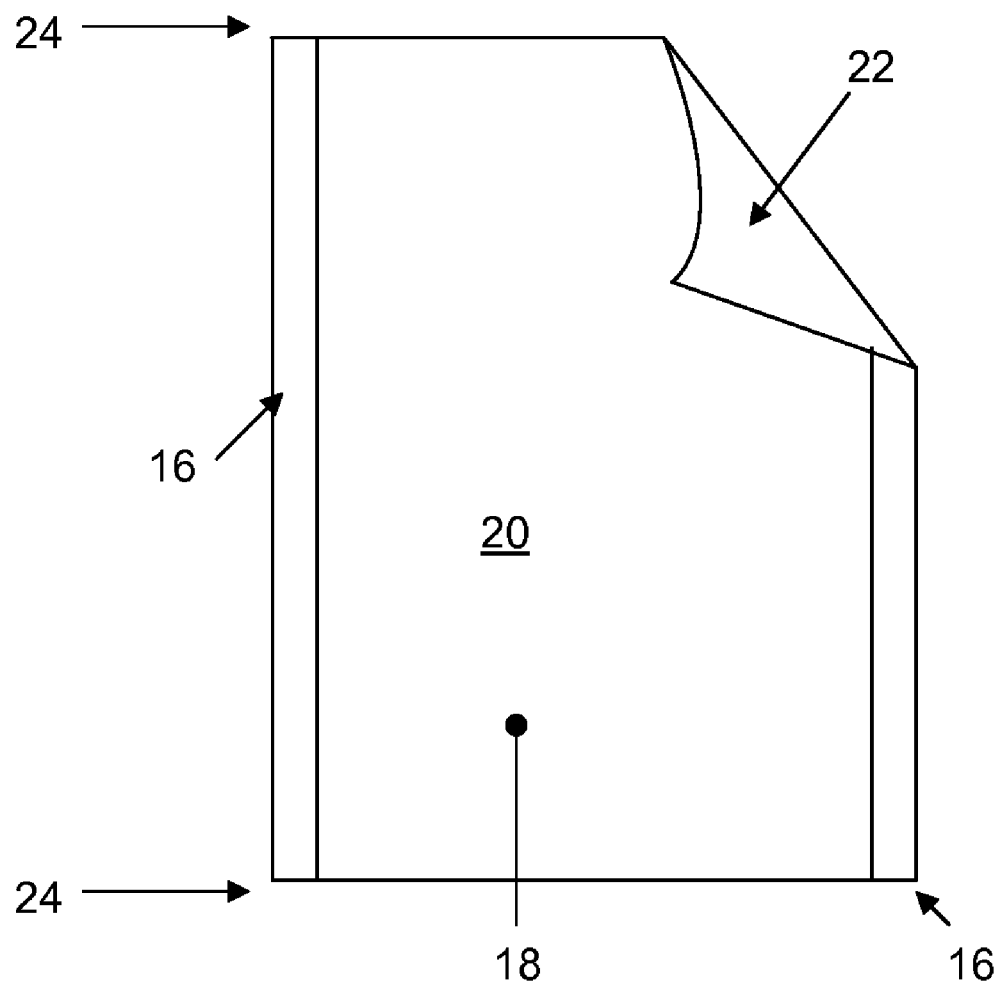
FIG. 3 is front side view of a conductive element, which shows the top side and bottom side of the conductive element.

Referring to FIG. 3, the invention provides that the conductive elements 14 described herein include a top side 20 and a bottom side 22. The bottom side 22 is preferably coated with a conductive adhesive material. According to such embodiments, as illustrated in FIG. 2, the bottom side 22 of each conductive element 14 may be wrapped around a spoke 12 of the wire mesh support such that opposite ends 24 of each conductive element 14 are adhered together by the adhesive material present on the bottom side 22 of each conductive element 14. Although an adhesive material may be employed to secure the opposite ends 24 of each conductive element 14 to each other, the invention provides that other means could be used, such as magnets, Velcro®, crimping, or other means.

Figure 4:
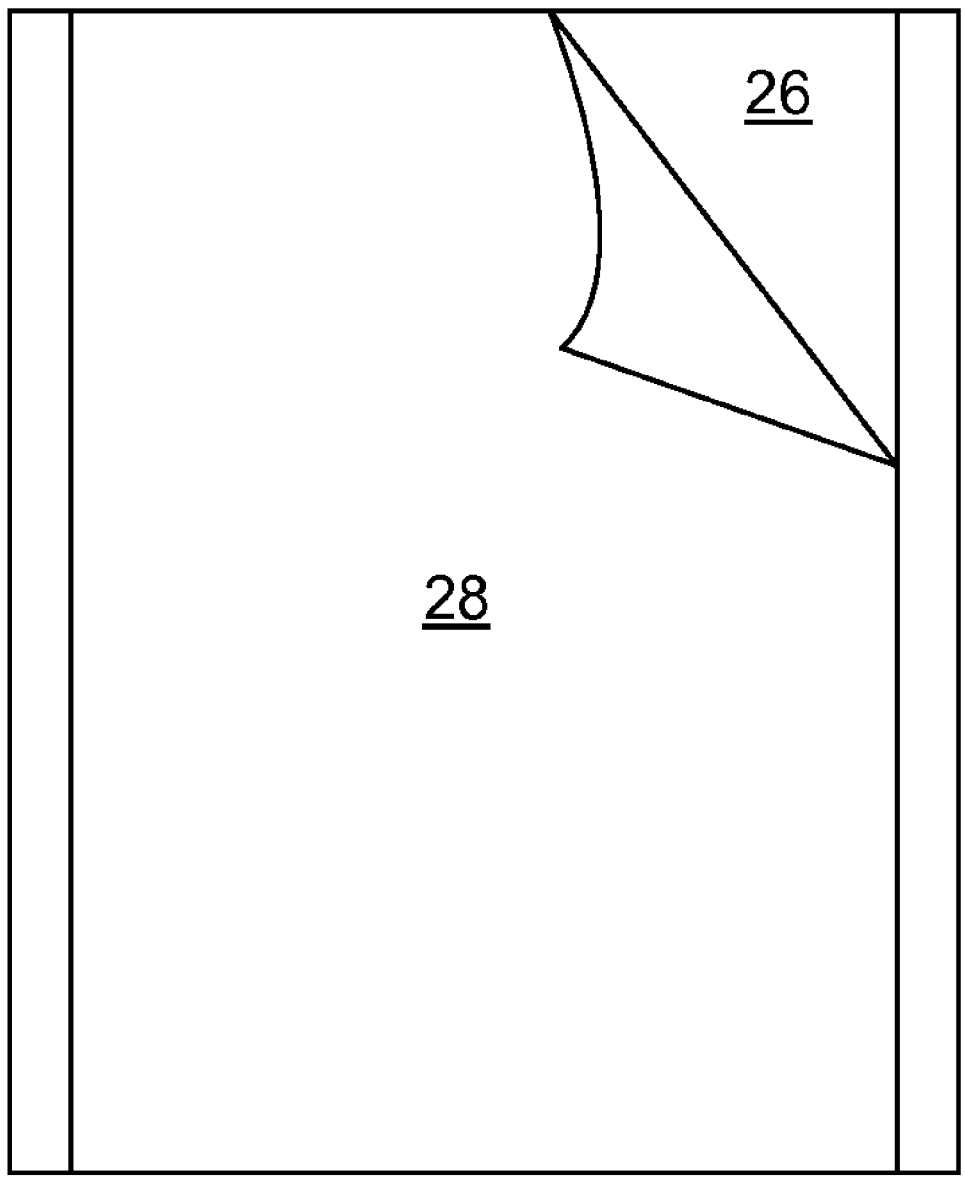
FIG. 4 is front side view of a conductive element, which shows the masking layer being pulled away from the top side of the conductive element to reveal the conductive metal surface thereof.

Referring to FIG. 4, in certain preferred embodiments, the invention provides that the conductive surface 26 of the middle portion 18 of each conductive element 14 may comprise tin, copper, or combinations thereof—although other conductive materials may be used. Preferably, however, the conductive surface 26 will be comprised of a conductive material that is resistant to corrosion or rust (which would otherwise compromise the conductivity of the middle portion 18 of each conductive element 14, and reduce its ability to electrically bond or ground the tray 10).

The suspension tray described herein will further comprise an electrical connection via a mechanical splice (not shown) that connects each of the plurality of electrical conductive elements 14 together. As such, the spliced conductive elements 14 will, collectively, serve to electrically bond/ground the suspension tray 10—and be capable of operating as a sink for (and transfer) an electrical charge.

Although FIGS. 1-4 illustrate the conductive elements 14 to exhibit a rectangular shape, the invention provides that other shapes may be utilized. Preferably, however, the side portions (and/or perimeter) of the conductive elements will be sealed by a paint composition as described herein, in order to prevent moisture from penetrating an interior portion thereof (and causing the conductive element to erode over time). Similarly, although the conductive elements may exhibit a variety of shapes, the invention provides that the middle portion thereof will comprise a conductive surface—which may be electrically conductive via mechanical splicing with other conductive elements, as described herein.

According to further preferred embodiments of the present invention, methods for mechanically bonding/grounding cable and/or wire suspension trays are provided. More particularly, the methods generally comprise providing a tray 10 which includes a series of spokes 12, e.g., interconnecting wires, which form a wire mesh support on which a plurality of cables and wires may be placed. The methods further comprise attaching a plurality of conductive elements 14 to the wire mesh support. Preferably, as described above, each conductive element 14 will be configured to be attached to the wire mesh support, and may include two side portions 16 and a middle portion 18, with the two side portions 16 being exposed to the air and the middle portion 18 being provided with a masking layer 28—which covers the conductive surface 26 described herein. Next, the methods of the present invention provide that paint may be applied to the tray 10 and conductive elements 14 affixed thereto, such as by spraying such components with the desired paint. The methods of the present invention further comprise, preferably after the paint has dried, removing the masking layer 28 from the middle portion 18 of each conductive element 14, in order to uncover (expose) the conductive surface 26. The methods further comprise attaching a mechanical splice (not shown) between the conductive surfaces 26 of each of the plurality of conductive elements 14.

According to additional aspects of the present invention, kits are provided that may be used to construct the devices and/or carry out the methods described herein. For example, a kit may comprise a tray 10, as described herein, which comprises a series of spokes 12 that, collectively, form a wire mesh support on which various cables and/or wires may be placed. In addition, such kits may include a plurality of conductive elements 14, with each conductive element possibly having two side portions 16 and a middle portion 18. As describe above relative to other embodiments, the two side portions 16 are preferably exposed to the air, whereas the middle portion comprises a conductive surface 26 that is covered with a removable masking layer 28. The conductive elements 14 included with such kits will, as described herein, include a top side 20 and a bottom side 22, with the bottom side 22 preferably being coated with an adhesive material. Preferably, the bottom side 22 may also include a layer (not shown) that may be removed to reveal the adhesive material, such that the conductive elements 14 may be adhered to (wrapped around) the spokes 12 of the tray 10 as described herein.

The kits of the present invention may further comprise an electrical splice, which is adapted to electrically connect the conductive surface 26 of each conductive element 14—after paint has been applied to the tray 10 and the conductive elements 14 affixed thereto (and the masking layers 28 have been removed from the middle portion 18 of each conductive element 14). The kits may, optionally, further include the paint that may be applied to the tray 10 and conductive elements 14 described herein.

The invention provides that the trays described herein may be used for supporting, suspending and retaining a variety of different articles within a building, such as telecommunication cables, power cables, and other items. The trays may be used to support, suspend, and retain such articles within the interior portion of a building, such as a location near the topside of an interior wall of a building, within or beneath a floor, and other areas. However, the invention provides that, in certain embodiments, the trays may also be used to support, suspend, and retain articles outside of a building, such as a location near the topside of an exterior wall.

The wire mesh portion of the trays described herein may be constructed of any suitable material. For example, the trays may be constructed of stainless steel, aluminum, other metals or alloys, or combinations of the foregoing. In addition, the present invention provides that the trays described herein may be secured to a wall using screws, nails, adhesives, or other fastening means or, in certain cases, may utilize a gravity force to stability the support trays described herein.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. A suspension tray adapted to hold a plurality of cables, wires, or combinations thereof, which includes a device for electrically bonding and grounding the tray, wherein: (a) the tray comprises a series of spokes forming a wire mesh support on which the cables or wires are placed; and (b) the device comprises a plurality of conductive elements affixed to the wire mesh support, wherein each conductive element comprises two side portions and a middle portion, wherein the two side portions are sealed with a paint composition and the middle portion comprises a conductive surface that is capable of electrically bonding and grounding the tray.

2. The suspension tray of claim 1, wherein the conductive elements comprise a top side and a bottom side, wherein the bottom side comprises an adhesive material.

3. The suspension tray of claim 2, wherein the bottom side of each conductive element is wrapped around a spoke of the wire mesh support such that opposite ends of each conductive element are adhered together by the adhesive material present on the bottom side of each conductive element.

4. The suspension tray of claim 3, wherein the conductive surface of the middle portion of each conductive element is comprised of tin, copper, or combinations thereof.

5. The suspension tray of claim 4, which further comprises a mechanical splice that electrically connects each of the plurality of conductive elements.

6. A method for electrically bonding and grounding a suspension tray adapted to hold a plurality of cables, wires, or a combination thereof, which comprises the steps of: (a) providing a tray which comprises a series of spokes that form a wire mesh support on which a plurality of cables or wires are placed; (b) attaching a plurality of conductive elements to the wire mesh support, wherein each conductive element comprises two side portions and a middle portion, wherein the two side portions are exposed and the middle portion is covered by a masking layer; (c) applying paint to the tray and conductive elements; (d) removing the masking layer from the middle portion of each conductive element to uncover a conductive surface; and (e) attaching a mechanical splice between the conductive surface of each of the plurality of conductive elements.

7. The method of claim 6, wherein the conductive elements comprise (i) a top side and (ii) a bottom side that is coated with a conductive adhesive material, wherein the plurality of conductive elements are attached to the wire mesh support by wrapping the bottom side of each conductive element around a spoke of the wire mesh support such that opposite ends of each conductive element are adhered together by the conductive adhesive material present on the bottom side of each conductive element.

8. The method of claim 7, wherein the conductive surface of the middle portion of each conductive element is comprised of tin, copper, or a combination thereof.

9. A kit for constructing a suspension tray adapted to hold a plurality of cables, wires, or a combination thereof, wherein the kit comprises: (a) a tray which comprises a series of spokes forming a wire mesh support on which the cables or wires are placed; and (b) a plurality of conductive elements, wherein each conductive element comprises two side portions and a middle portion, wherein the two side portions are exposed and the middle portion comprises a conductive surface that is covered with a removable masking layer.

10. The kit of claim 9, wherein a bottom side of each conductive element is coated with an adhesive material, such that the bottom side may be wrapped around a spoke of the wire mesh support such that opposite ends of the conductive element are adhered together.

11. The kit of claim 10, wherein the conductive surface of the middle portion of each conductive element is comprised of tin, copper, or a combination thereof.

12. The kit of claim 11, which further comprises an electrical splice, which is adapted to electrically connect the conductive surface of each conductive element after (i) paint has been applied to the tray and a plurality of the conductive elements affixed thereto and (ii) the masking layer has been removed from the middle portion of each conductive element.

* * * * *